United States Patent [19]

Cardwell, Jr.

[11] Patent Number: 4,943,903

[45] Date of Patent: Jul. 24, 1990

[54] POWER SUPPLY IN WHICH REGULATION IS ACHIEVED BY PROCESSING A SMALL PORTION OF APPLIED POWER THROUGH A SWITCHING REGULATOR

[76] Inventor: Gilbert I. Cardwell, Jr., 27601 Eastvale Rd., Palos Verdes Peninsula, Calif. 90274

[21] Appl. No.: 322,836

[22] Filed: Mar. 14, 1989

[51] Int. Cl.⁵ .......................................... H02M 3/337
[52] U.S. Cl. .................................... 363/97; 323/263; 363/25; 363/134
[58] Field of Search .................. 363/25, 26, 97, 101, 363/134, 72; 323/263; 307/45, 46

[56] References Cited

U.S. PATENT DOCUMENTS

| | | | |
|---|---|---|---|
| 3,571,692 | 3/1971 | Andren | 363/72 |
| 3,596,172 | 7/1971 | Harrison | 323/263 |
| 3,764,887 | 10/1973 | Bingley | 323/263 |
| 3,925,715 | 12/1975 | Venable | 363/26 |
| 4,034,280 | 7/1977 | Cronin et al. | 363/25 |
| 4,445,049 | 4/1984 | Steigerwald | 307/45 |

FOREIGN PATENT DOCUMENTS

| | | | |
|---|---|---|---|
| 832542 | 5/1981 | U.S.S.R. | 363/25 |
| 851692 | 8/1981 | U.S.S.R. | 363/101 |
| 888307 | 12/1981 | U.S.S.R. | 363/134 |
| 902168 | 2/1982 | U.S.S.R. | 363/25 |
| 928320 | 5/1982 | U.S.S.R. | 363/89 |
| 1283904 | 1/1987 | U.S.S.R. | |

Primary Examiner—William H. Beha, Jr.
Attorney, Agent, or Firm—Terje Gudmestad; Paul M. Coble; Wanda K. Denson-Low

[57] ABSTRACT

Regulation of an AC or DC voltage is achieved by processing a major portion of the prime power through a square wave inverter and a small portion of the prime power through a pulse width modulated switching regulator. The methods of regulation generally comprises the steps of: processing the unregulated input voltage to provide an output voltage; regulating an unregulated portion of the input voltage in response to a feedback signal indicative of the output voltage to provide a regulating voltage; and combining the regulating voltage with the output voltage to generate a regulated output voltage. The regulator circuit includes a square wave inverter circuit that produces a voltage in an output transformer, while a pulse width modulator regulates the output voltage in response to a feedback signal. The regulation is accomplished by pulse width modulating the portion of the input voltage that is unregulated, and applying this modulated voltage to a second transformer that combines the pulse width modulated voltage with the primary voltage in an AC fashion to produce the regulated output voltage. The invention improves the efficiency and reduces the weight and complexity of conventional voltage regulating devices.

16 Claims, 2 Drawing Sheets 4,943,903

POWER SUPPLY IN WHICH REGULATION IS ACHIEVED BY PROCESSING A SMALL PORTION OF APPLIED POWER THROUGH A SWITCHING REGULATOR

BACKGROUND

The present invention relates to regulated DC to DC converters and voltage regulation methods, and more particularly to a circuit in which a major portion of the prime power is processed through a square wave inverter, and in which regulation is achieved by processing a small portion of the prime power through a pulse width modulated switching regulator.

Given a regulated prime power source, power can be processed to useful voltage levels with a basic square wave inverter and transformer. This assumes a DC source and DC loads. The square wave inverter is very efficient and is very light in weight for a given power processed.

However, when the prime power source is not regulated, and there is a requirement for regulated voltage outputs, a number of options are available, including the following: (1) to regulate the prime power; (2) to regulate the output; or (3) to operate an inverter in a non-square wave fashion that employs pulse width modulation techniques to achieve regulation. Options (1) and (2) are occasionally selected, usually at a cost of efficiency and weight. Option (2) is rarely selected where high voltage is required. Option (3) is generally selected where weight and efficiency are a concern, especially if high voltages are required as outputs.

A number of circuits falling in the category of option (3) are known and used to regulate power for traveling-wave tubes in space applications, for example. One novel and efficient arrangement is disclosed in U.S. Pat. No. 3,925,715, entitled "Regulated DC to DC Converter", issued to H. D. Venable on Dec. 9, 1975. This converter circuit employs pulse width modulation in a manner such that a significant amount of ripple current is produced. The filter elements required in this circuit can be large and relatively lossy, even though this circuit is one of the most efficient and lowest weight arrangements currently in use.

SUMMARY OF THE INVENTION

It is a feature of the present invention to provide a means of efficiently processing and regulating power for a traveling-wave tube or any other device requiring regulated power.

Another feature of the invention is to provide a significant reduction in size and weight of regulated DC to DC converters and voltage regulators in general.

A further feature of the present invention is to provide increased efficiency regulated DC to DC converters and voltage regulators in general.

In order to improve the efficiency of and reduce the weight and complexity of voltage regulating devices, the present invention provides a method of regulating an unregulated AC or DC input voltage to generate a regulated output voltage, and a novel voltage regulator device. The method comprises processing an input voltage derived from an unregulated input voltage to provide a regulated output voltage. The method generally comprises the steps of: (1) processing the unregulated input voltage to provide an output voltage; (2) regulating an unregulated portion of the input voltage to provide a regulating voltage; and (3) combining the regulating voltage with the output voltage to generate a regulated output voltage. Regulation of the unregulated portion of the input voltage may be in response to a feedback signal indicative of the output voltage.

The regulator of the present invention may comprise a first transformer having a plurality of primary and secondary windings, and a second transformer having center-tapped primary and secondary windings. The secondary winding of the second transformer is coupled between the unregulated input voltage source and the primary windings of the first transformer. A square wave inverter coupled to the primary windings of the first and second transformers produces square wave voltages in the first and second transformers. A pulse width modulator coupled between the unregulated input voltage source and the square wave inverter and processes the unregulated portion of the unregulated input voltage. The pulse width modulator modulates the voltage coupled from the second transformer to the first transformer in response to an optional feedback signal indicative of the regulated output voltage.

The major portion of the input power is processed through the square wave inverter, while regulation is achieved by processing a small portion of the input power through a switching regulator. The regulated voltage is produced by varying the voltage at the input to the second transformer, which acts as a voltage control source, in series with the input from the input voltage source. Regulation of only the unregulated portion of the input voltage minimizes the size, weight and the power processing capacities of the components required to regulate the output voltage. Also, the circuit is more efficient than conventional power supply regulation circuits.

BRIEF DESCRIPTION OF THE DRAWING

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
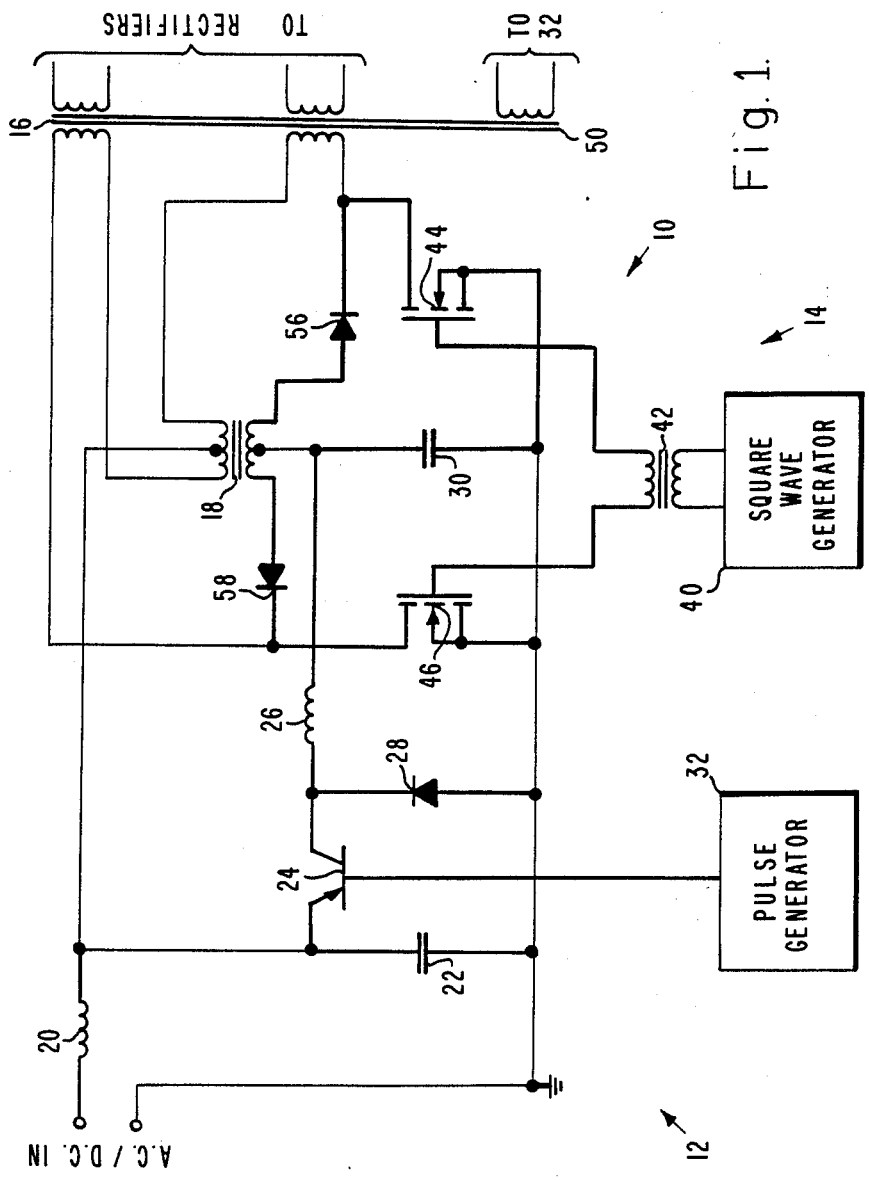
FIG. 1 illustrates a first embodiment of a regulator circuit that embodies the principles of the present invention.

Referring to FIG. 1, a first embodiment of a regulator circuit 10 in accordance with the principles of the present invention is shown. The regulator circuit 10 is employed with an unregulated DC input voltage source (not shown). The unregulated DC input voltage source supplies an unregulated DC input voltage, such as may be supplied for use with a traveling-wave tube, for example, which may be on the order of 50 volts±10%.

The present regulator circuit 10 will be described in the context of its use in a traveling-wave tube power supply. However, it is to be understood that the principles of the present invention are generally applicable to any regulator circuit.

In general, the balance of the regulator circuit 10 comprises a pulse width modulation circuit 12, a square wave inverter circuit 14 and two transformers 16, 18. The pulse width modulation circuit 12 includes a capacitor 22 coupled across the input to the regulator 10, a switch which in the embodiment of FIG. 1 is a transistor 24, an inductor 26, a diode 28 coupled from a point between the transistor 24 and the inductor 26 and ground, and an optional capacitor 30. In addition, a pulse generator circuit 32 is coupled to the base of the transistor 24 that is operative to pulse width modulate the duty cycle of the transistor 24. The pulse width modulation circuit 12, including the pulse generator circuit 32, are conventionally well-known circuit types and will not be described in detail herein.

The square wave inverter circuit 14 is comprised of a square wave generator 40, which is coupled by way of an optional transformer 42 to two switches, which in the embodiment of FIG. 1 are switching transistors 44, 46. The switching transistors 44, 46 are coupled to the primary windings of a second transformer 16 whose voltage output is regulated in accordance with the present invention. The switching transistors 44, 46 are also coupled by way of two diodes 56, 58 to the center-tapped primary winding of a third transformer 18 that is employed to generate the regulating voltages that regulate the output voltage from the second transformer 16.

The center tap of the primary winding of the third transformer 18 is coupled to receive voltage from the pulse width modulation circuit 12 by way of the inductor 26. The center tap of the secondary winding of the third transformer 18 is coupled to the input voltage source through an optional input filter comprising an inductor 20. The secondary winding of the third transformer 18 is connected in series with each of the primary windings of the second transformer 16.

An optional feedback arrangement 50 is provided which samples the regulated voltage at the output of the second transformer 16 and couples a feedback signal to the pulse generator circuit 32 in order to control the pulse width modulation, and hence the regulation of the present invention. The feedback arrangement is not necessary in all contemplated embodiments, and "feedback" may be accomplished by means of a potentiometer, for example, which is set by the user.

The regulator 10 of FIG. 1 operates as follows. An unregulated input voltage is applied across the input of regulator 10. Assume, for example, that the unregulated power source is unregulated by 10%. This voltage is coupled through the secondary winding of the third transformer 18 to the primary windings of the second transformer 16. The square wave inverter circuit 14 operates to chop the input voltage to provide an alternating current signal at the primary winding of the second transformer 16. The output from the regulator 10 is taken across the secondary winding of the second transformer 16.

The feedback arrangement 50 samples the regulated output voltage and provides an input control voltage to the pulse generator circuit 32, which in turn modulates the duty cycle of the transistor 24. Consequently, the input voltage is coupled to the center tapped primary of the third transformer 18. The windings of the second and third transformers 16, 18 are appropriately phased such that the voltage contribution from the pulse width modulation circuit 12 adds or subtracts to the voltage at the secondary winding of the third transformer 18 so that the voltage at the secondary windings of the second transformer 16 is regulated. This voltage may then be applied to a suitable rectifier arrangement to produce a square wave voltage which may be used to drive a traveling-wave tube, for example.

In the operation of the regulator circuit 10, if the unregulated power source has a nominal value of 50 volts, for example, and is unregulated by 10%, then the input voltage varies from 45 to 50 volts. Assume that the input voltage is 45 volts. The turns ratio of the third transformer 18 is set at 9:1, so that the pulse width modulation circuitry 12 processes only one ninth the power provided by the input voltage source. With a 9:1 turns ratio and the pulse width modulator operating at 100% duty cycle, the center tap of the primary winding of the third transformer 18 will be at 45 volts, producing a secondary voltage of 5 volts. The 5 volts produced across the secondary winding of the third transformer 18 is added to the 45 volts at the center tap of the secondary winding of the third transformer 18 for a total of 50 volts and is applied to the primary winding of the second transformer 16.

Now assume that the input voltage is 50 volts. The duty cycle of the pulse width modulator is zero percent and no voltage is applied to the center tap of the third transformer 18. No voltage is across the secondary winding of the third transformer 18, and therefore 50 volts is again imposed across the primary winding of the second transformer 16. Now assume that the input voltage varies between 45 and 50 volts. It can be seen that the pulse width modulator can be controlled by the feedback arrangement to a duty cycle between 0 and 100 percent to obtain a regulated 50 volt signal across the primary winding of the second transformer 16, thus providing a regulated voltage output at the second transformer 16.

Figure 2:
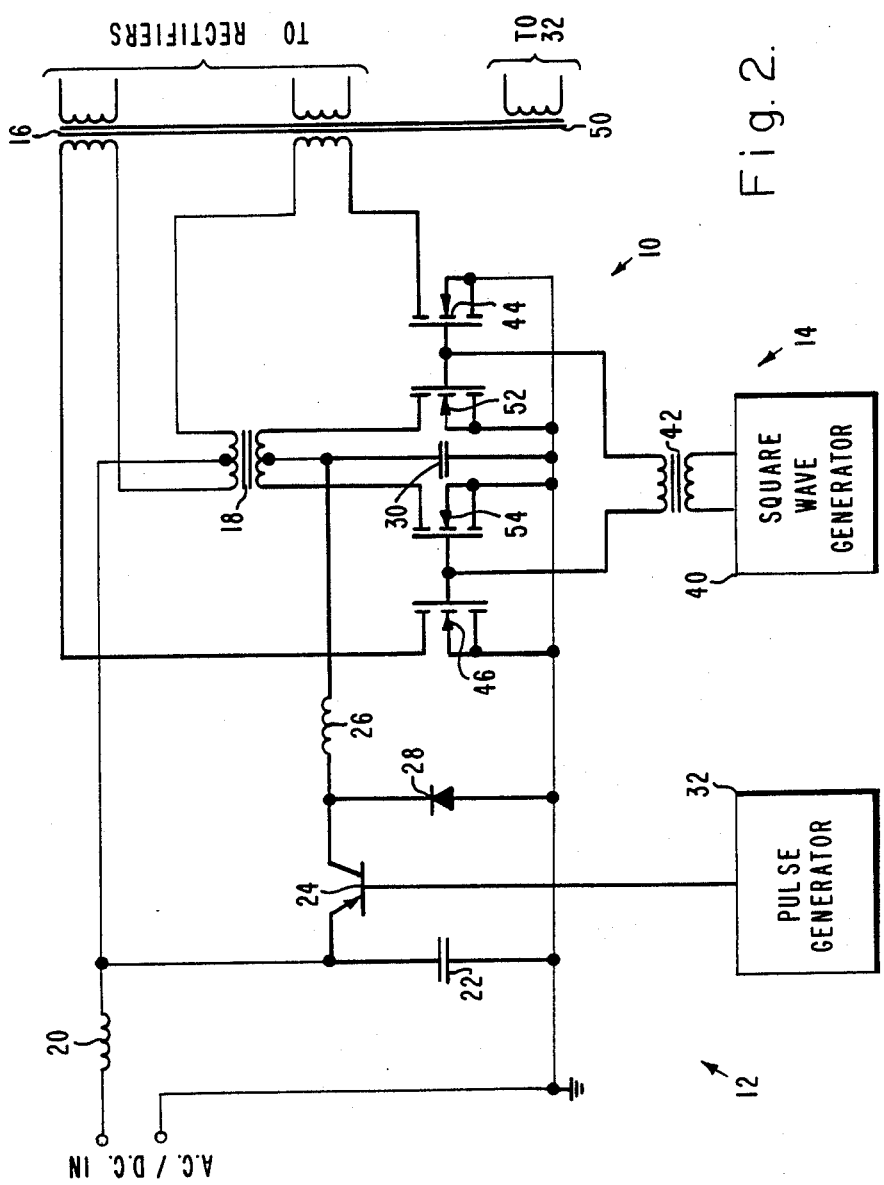
FIG. 2 illustrates a second embodiment of a regulator circuit that embodies the principles of the present invention.

With reference to FIG. 2, there is shown a second embodiment of a regulator 10 in accordance with the principles of the present invention. The regulator 10 of FIG. 2 is substantially the same as that of FIG. 1, except that two additional switches, shown as transistors 52 and 54, are employed. These two transistors are driven in a similar manner as transistors 44 and 46. Transistors 44 and 52 are turned on simultaneously with transistors 46 and 54. The two added transistors 52, 54 switch the voltage applied across the primary winding of the third transformer 18, while transistors 44, 46 process the bulk of the current as in the embodiment of FIG. 1.

The operation of the circuit of FIG. 2 is substantially the same as the circuit of FIG. 1. In general, the first set of coupled switching transistors comprising transistors 44, 52 and the second set of coupled switching transistors comprising transistors 46,54 are operated square wave. The second transformer 16 is the main power processing transformer while the third transformer 18 is a small transformer used to add voltage to the unregulated input to the second transformer 16, such that regulated voltage appears across it. This added voltage is produced by means of the pulse width modulation circuit 12, and in particular, the pulse width modulation of the transistor 24.

Transistors 24, 52 and 54 and the third transformer 18 process only the unregulated percentage of the prime power provided by the DC input source. For example, if the prime power is unregulated by 10%, with a fixed voltage change of +5%, then 10% of the total power is processed by transistors 24, 52 and 54 and the third transformer 18. The turns ratio of the third transformer 18 is approximately 10:1, and the smoothing inductor 26 is relatively small compared to the total power processed by the regulator 10.

The regulator 10 of FIG. 2 was built and tested as part of a traveling-wave tube power supply supplying about 6000 volts derived from a 50 volt input power source. This regulator 10 demonstrated an efficiency of about 97% operating alone, which yielded an overall power supply efficiency of about 93%. This may be compared to a conventional power supply which had an efficiency of about 89%. The size and weight of the regulator and the power supply were significantly reduced. In particular, the conventional power supply weighed about 5 pounds, while the power supply implemented with the regulator 10 of the present invention weighed less than 4 pounds.

The present invention also provides for a method of processing an unregulated DC input voltage to generate a regulated DC output voltage. The method generally comprises the steps of: (1) processing the unregulated DC input voltage to generate a DC output voltage; (2) regulating the unregulated portion of the unregulated DC input voltage in response to a feedback signal indicative of the regulated output voltage to provide a regulating voltage; and (3) combining the regulating voltage with the DC input voltage to generate a regulated AC output voltage, which is conventionally rectified to obtain a regulated DC voltage.

Thus, there has been described a new and improved method of regulating an unregulated DC power source and regulator circuitry that improves the efficiency of and reduces the weight and complexity of DC voltage regulating devices.

It is to be understood that the above-described embodiments are merely illustrative of some of the many specific embodiments which represent applications of the principles of the present invention. Clearly, numerous and other arrangements can be readily devised by those skilled in the art without departing from the scope of the invention. In particular, the regulator circuits and methods of the present invention are generally applicable to those applications that require regulated AC or DC power, and are not limited to use in traveling-wave tube power supplies, for example. In addition, the techniques of the present invention may be used with resonant converters to regulate sine wave output, for example. The square wave generator shown in the figures herein would be replaced by a resonant drive system as is generally known in the art. Consequently, the DC or DC converter embodiment is described herein only for the purposes of easily describing the novel aspects of the present invention and should not be considered as limiting the scope thereof.

What is claimed is:

1. Voltage regulation means for generating a regulated output by processing a small portion of an applied unregulated input voltage through a switching regulator, said voltage regulation means comprising:
   first transformer means for providing a regulated output voltage from the voltage regulation means;
   second transformer means coupled to the first transformer means for coupling a regulating voltage to the first transformer means that regulates the output voltage;
   switch means coupled to the unregulated input voltage source and to the second transformer means for coupling the unregulated portion of the input voltage to the second transformer means;
   square wave inverter means coupled to the first and second transformer means for providing an alternating current square wave voltage thereto; and
   pulse width modulation means coupled to the switch means for modulating the duty cycle of the switch means to modulate the voltage applied to the second transformer means, and hence regulate the output voltage of the voltage regulation means.

2. The voltage regulation means of claim 1 that further comprises:
   feedback means coupled between the first transformer means and the pulse width modulation means for generating a feedback signal indicative of the regulated output voltage.

3. The voltage regulation means of claim 1 wherein the square wave inverter means comprises a square wave generator coupled to two switches.

4. The voltage regulation means of claim 3 wherein the square wave generator means further comprises a transformer coupled between the square wave generator and the two switches.

5. The voltage regulation means of claim 3 wherein the second transformer means is coupled to the input voltage source through an input filter comprising an inductor.

6. The voltage regulation means of claim 4 wherein the two switches comprise switching transistors.

7. The voltage regulation means of claim 6 wherein the first transformer means comprise a plurality of primary and secondary windings and the switching transistors are coupled to the primary windings thereof to switch the voltage applied thereto.

8. The voltage regulation means of claim 4 wherein the square wave inverter means comprises a square wave generator coupled to four switches, wherein two of the switches are coupled to the primary windings of the first transformer means, and the remaining two switches are coupled to the transformer of the voltage regulation means.

9. Voltage regulation means for generating a regulated output by processing a small portion of an applied unregulated input voltage through a switching regulator, said voltage regulation means comprising:
   first transformer means for providing a regulated output voltage from the voltage regulation means;
   second transformer means coupled to the first transformer means for coupling a regulating voltage to the first transformer means that regulates the output voltage;
   switch means coupled to the unregulated input voltage source and to the second transformer means for coupling the unregulated portion of the input voltage to the second transformer means;
   feedback means for generating a feedback signal indicative of the regulated output voltage;
   square wave generator means coupled to the first and second transformer means for providing an alternating current square wave voltage thereto; and
   pulse width modulation means coupled to the feedback means and to the switch means for responding to the feedback signal and modulating the duty cycle of the switch means to modulate the voltage applied to the second transformer means, and hence regulate the output voltage of the voltage regulation means.

10. The voltage regulation means of claim 9 wherein the square wave generator means comprises a square wave generator coupled to two switches.

11. The voltage regulation means of claim 9 wherein the square wave generator means comprises a square wave inverter coupled to two switches.

12. The voltage regulation means of claim 10 wherein the square wave generator means further comprises a transformer coupled between the square wave generator and the two switches.

13. The voltage regulation means of claim 10 wherein the second transformer means is coupled to the input voltage source through an input filter comprising an inductor.

14. The voltage regulation means of claim 11 wherein the two switches comprise switching transistors.

15. The voltage regulation means of claim 11 wherein the first transformer means comprise a plurality of primary and secondary windings and the switching transistors are coupled to the primary windings thereof to switch the voltage applied thereto.

16. The voltage regulation means of claim 11 wherein the square wave inverter means comprises a square wave generator coupled to four switches, wherein two of the switches are coupled to the primary windings of the first transformer means, and the remaining two switches are coupled to the transformer of the voltage regulation means.

* * * * *